United States Patent Office 3,702,864
Patented Nov. 14, 1972

3,702,864
ALLYL OR PROPARGYL ESTERS OF SUBSTITUTED
α-PHENYL PHENYLACETIC ACID
Shigeyoshi Kitamura, Toyonaka, Hajime Hirai, Minoo, Yositosi Okuno, Toyonaka, and Keimei Fujimoto, Kobe, Japan, assignors to Sumitomo Chemical Company, Ltd., Higashi-ku, Osaka, Japan
No Drawing. Filed Mar. 16, 1970, Ser. No. 20,058
Claims priority, application Japan, Mar. 29, 1969, 44/24,144; Apr. 12, 1969, 44/28,414
Int. Cl. C07c 69/76
U.S. Cl. 260—473 A                 9 Claims

ABSTRACT OF THE DISCLOSURE

Diphenylmethane derivatives represented by the formula,

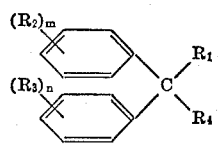

wherein $R_1$ is —OR, —COOR or —CH$_2$OR, in which R is propargyl or allyl; $R_2$ and $R_3$ are hydrogen, a halogen, an alkyl or methylenedioxy bonded to two carbon atoms adjacent to each other on the benzene ring; when R is propargyl $R_4$ is hydrogen, an alkyl, —OR', —COOR', —CH$_2$OR' or

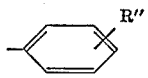

in which R' is propargyl, allyl or an alkyl and R'' is an alkyl or a halogen, when R is allyl $R_4$ is —OR''', —COOR''' or —CH$_2$OR''' in which R''' is allyl or an alkyl; $m$ and $n$ are an integer of 1 to 5 and when $m$ and/or $n$ are an integer of 2 or more, $R_2$'s and/or $R_3$'s may be the same or different; the diphenylmethane derivatives being employable as synergists for insecticides.

---

This invention relates to a method for producing a novel diphenylmethane derivative represented by the following Formula I, and to a composition comprising said diphenylmethane derivative as an effective ingredient:

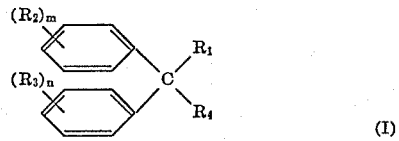

wherein $R_1$ is —OR, —COOR or —CH$_2$OR, in which R is propargyl or allyl; $R_2$ and $R_3$ are hydrogen, a halogen, an alkyl or methylenedioxy bonded to two carbon atoms adjacent to each other on the benzene ring; when R is propargyl $R_4$ is hydrogen, an alkyl, —OR', —COOR', —CH$_2$OR' or

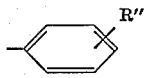

in which R' is propargyl, allyl or an alkyl and R'' is an alkyl or a halogen, when R is allyl $R_4$ is —OR''', —COOR''' or —CH$_2$OR''' in which R''' is allyl or an alkyl; $m$ and $n$ are an integer of 1 to 5 and when $m$ and/or $n$ are an integer of 2 or more, $R_2$'s and/or $R_3$'s may be the same or different.

In the present invention, the term "alkyl" and "alkoxy" mean a straight chain- or branched chain- alkyl and alkoxy having 1 to 4 carbon atoms.

The compounds of the present invention show only weak insecticidal activity when used alone, nevertheless they can markedly enhance the effectiveness of other insecticides such as cyclopropanecarboxylate and carbamates, or mixtures of two or more of these insecticides, when said compounds are added thereto in an amount of 0.5 to 50 times the weight of said insecticides. Moreover, the present compounds are relatively inexpensive and low in toxicity to mammals so that they can be advantageously used also to increase the safeness of insecticides.

The most advantageous amount of the present compounds to be added is determined by the purpose of the addition and by the kind of insecticide, because said amount depends upon the degree of desired reinforcement of insecticidal activity and the relative cost of the present compound to that of given insecticide.

The diphenylmethane derivatives having the general Formula I are novel compounds which have been first synthesized by the present inventors. According to the present invention, these compounds may be readily produced in high yields at low costs by reacting a compound having the formula,

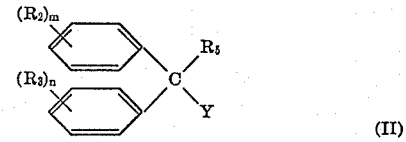

wherein $R_2$, $R_3$, $m$ and $n$ are as defined above, $R_5$ is hydrogen, an alkyl, hydroxyl, carboxyl, hydroxymethyl, —OR', —COOR', —CH$_2$OR' or

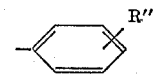

in which R' and R'' are as defined above, and Y is hydroxyl, carboxyl, hydroxymethyl, a halogen, an alkoxycarbonyl or an acyl halide, or an acid anhydride thereof with a compound having the formula, $$R_6 \cdot X \qquad\qquad (III)$$

wherein $R_6$ is propargyl, allyl or an alkyl and X is a halogen atom or hydroxyl.

The present process for producing the diphenylmethane (I) may be illustrated in detail as follows:

The first embodiment of the process is to obtain the diphenylmethane (I) by reacting the compound having carboxyl as Y or as Y and $R_5$ in the Formula II, with the alcohol having the formula, $R_6 \cdot OH$ wherein $R_6$ is as defined above.

In this reaction, a dehydrating agent such as sulfuric acid, hydrochloric aid and p-toluene sulfonic acid may be preferably employed, and the reaction may be preferably conducted in a solvent.

The second embodiment of the process is to obtain the diphenylmethane (I) by reacting the compound having carboxyl as Y or as Y and $R_5$ in the Formula II, with the halide having the formula, $R_6 \cdot Hal$ wherein $R_6$ is as defined above and Hal is a halogen.

This reaction may be preferably conducted in an inert solvent in the presence of basic condensing agents such as organic tertiary bases, hydroxides or carbonates of an alkali metal or an alkaline earth metal. In case where the organic tertiary base is employed as the condensing agent, said base may be reacted with said compound (II), or said halide in advance, but it is preferable to react the three reactants simultaneously.

In case where the hydroxides or carbonates are employed as the condensing agent, it is preferable to react said hydroxides or carbonate with the compound (II) in advance.

The third embodiment of the process is to obtain the diphenylmethane (I) by reacting the compound having an acyl halide as Y in the Formula II, with the alcohol having the formula, $R_6 \cdot OH$ wherein $R_6$ is as defined above.

This reaction may be preferably conducted in a solvent in the presence of a dehydrogenhalide agent such as organic tertiary base and carbonates of an alkali metal or an alkaline earth metal at relatively low temperature.

The fourth embodiment of the process is to obtain the diphenylmethane (I) by reacting acid anhydrides of the compound (II) with the alcohol having the fomula, $R_6 \cdot OH$ wherein $R_6$ is as defined above.

This reaction may be preferably conducted in an inert solvent under heating.

The fifth embodiment of the process is to obtain the diphenylmethane (I) by reacting the compound having alkoxycarbonyl as Y or as Y and $R_5$ in the Formula II, with alcohol having the formula, $R_6 \cdot OH$ wherein $R_6$ is as defined above.

This reaction may be preferably conducted in the presence of a catalyst for esterification and in the presence of a sodium alcoholate.

The sixth embodiment of the process is to obtain the diphenylmethane (I) by reacting an alkali metal salt of the compound having hydroxyl or hydroxymethyl as Y or as Y and $R_5$ in the Formula II, with the halide having the formula, $R_6 \cdot Hal$ wherein $R_6$ and $Hal$ are as defined above, or vice versa.

This reaction may be preferably conducted in an inert solvent at room temperature or higher.

The seventh embodiment of the process is to obtain the diphenylmethane (I) by reacting the compound having hydroxyl or hydroxylmethyl, as Y or as Y and $R_5$ in the Formula II, with the alcohol having the formula, $R_6 \cdot OH$ wherein $R_6$ is as defined above.

This reaction may be preferably conducted in the presence of a catalyst such as sulfuric acid and p-toluenesulfonic acid.

In the compounds having the Formula II, some compounds having the following Formula IV are novel compounds,

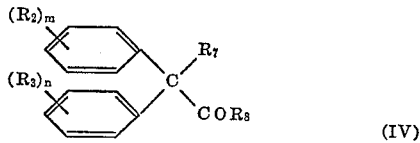

(IV)

wherein $R_7$ is hydroxyl, a halogen, an alkyloxy or allyloxy, $R_8$ is propargyloxy when $R_7$ is hydroxyl or a halogen, or $R_8$ is a halogen when $R_7$ is an alkyloxy or allyloxy, and $R_2$, $R_3$, $m$ and $n$ are as defined above.

The compounds having the Formula IV may be easily prepared in high yield according to the following procedures.

The compounds having propargyloxy as $R_8$ in the above-mentioned Formula IV may be prepared by reacting a compound having the Formula V,

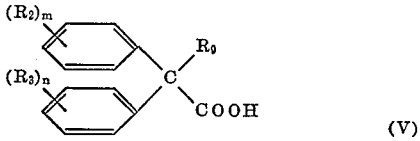

(V)

wherein $R_9$ is hydroxyl or a halogen and $R_2$, $R_3$ $m$ and $n$ are as defined above, or acid halides thereof with propargyl alcohol or a propargyl halide, if desired in the presence of a basic condensing agent or a dehydrogenhalide agent, or reacting a compound having the Formula VI,

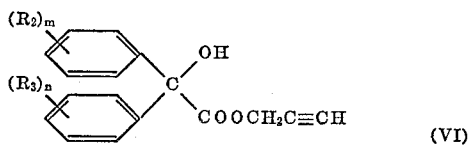

(VI)

wherein $R_2$, $R_3$, $m$ and $n$ are as defined above, with a halogenating agent such as phosphorus tribromide.

The compounds having a halogen as $R_8$ in the above-mentioned Formula IV may be prepared by reacting a compound having the Formula VII,

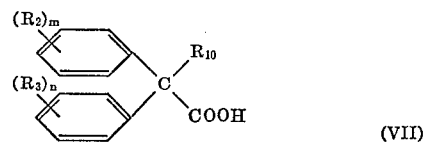

(VII)

wherein $R_{10}$ is an alkyloxy or allyloxy and $R_2$, $R_3$ $m$ and $n$ are as defined above, with a halogenating agent according to the conventional procedure.

The diphenylmethane derivatives having the general Formula I, are new compounds. The biological test showed that these new compounds have a powerful synergetic action to insecticides of chrysanthemic ester type and carbamate type, far stronger than that of piperonyl butoxide which has been an excellent synergist available so far commercially. A further advantage of the present compounds over piperonyl butoxide is complete lack of an irritating odor inherent to the latter.

Among compounds having aforementioned general Formula I, the following ones may be cited as the examples of compounds which are effective for the object of this invention:

Alkyloxy, allyloxy and propargyloxy derivatives of diphenylpropargyloxymethane, and their derivatives which phenyl groups bear at least one substituent selected from the group consisting of alkyls, halogen atoms and methylenedioxy bonded to two carbon atoms adjacent to each other on the benzene ring.

1-alkyloxy, 1-allyloxy and 1-propargyloxy derivatives of 1,1-diphenyl-2-propargyloxy-ethane, and their derivatives which phenyl groups bear at least one substituent selected from the group consisting of alkyls, halogen atoms and methylenedioxy bonded to two carbon atoms adjacent to each other on the benzene ring.

3-alkyloxy, 3-allyloxy and 3-propargyloxy derivatives of 2,2-diphenyl-1-propargyloxy-propane, and their derivatives which phenyl groups bear at least one substituent selected from the group consisting of alkyls, halogen atoms and methylenedioxy bonded to two carbon atoms adjacent to each other on the benzene ring.

α-Alkyloxy, α-allyloxy and α-propargyloxy derivatives of propargyl diphenylacetate, and their derivatives which phenyl groups bear at least one substituent selected from the group consisting of alkyls, halogen atoms and methylenedioxy bonded to two carbon atoms adjacent to each other on the benzene ring.

β-Alkyloxy, β-allyloxy and β-propargyloxy derivatives of propargyl α,α-diphenyl-propionate, and their derivatives which phenyl groups bear at least one substituent selected from the group consisting of alkyls, halogen atoms and methylenedioxy bonded to two carbon atoms adjacent to each other on the benzene ring.

Dipropargyl, propargylalkyl and propargylallyl esters of diphenylmalonic acid, and their derivatives which phenyl groups bear at least one substituent selected from the group consisting of alkyls, halogen atoms and methylenedioxy bonded to two carbon atoms adjacent to each other on the benzene ring.

1-alkyl derivatives of 1,1-diphenyl-1-propargyloxymethane and their derivatives which phenyl groups bear at least one substituent selected from the group consisting of alkyls, halogen atoms and methylenedioxy bonded to two carbon atoms adjacent to each other on the benzene ring.

α-Alkyloxy, α-allyloxy and α-propargyloxy derivatives of allyl diphenylacetate, and their derivatives which phenyl groups bear at least one substituent selected from the group consisting of alkyls, halogen atoms and methylenedioxy bonded to two carbon atoms adjacent to each other on the benzene ring.

β-Alkyloxy, β-allyloxy and β-propargyloxy derivatives of allyl α,α-diphenyl-propionate, and their derivatives which phenyl groups bear at least one substituent selected from the group consisting of alkyls, halogen atoms and methylenedioxy bonded to two carbon atoms adjacent to each other on the benzene ring.

2,2-diphenyl-1-propargyloxy-ethane, and their 2-alkyl derivatives, and their derivatives which phenyl groups bear at least one substituent selected from the group consisting of alkyls, halogen atoms and methylenedioxy bonded to two carbon atoms adjacent to each other on the benzene ring.

Propargyl diphenylacetate and their α-alkyl and α-phenyl derivatives, and their derivatives which phenyl groups bear at least one substituent selected from the group consisting of alkyls, halogen atoms and methylenedioxy bonded to two carbon atoms adjacent to each other on the benzene ring.

Alkyloxy and allyloxy derivatives of diphenyl-allyloxy-methane, and their derivatives which phenyl groups bear at least one substituent selected from the group consisting of alkyls, halogen atoms and methylenedioxy bonded to two carbon atoms adjacent to each other on the benzene ring.

2-alkyloxy and 2-allyloxy derivatives of 2,2-diphenyl-1-allyloxyethane, and their derivatives which phenyl groups bear at least one substituent selected from the group consisting of alkyls, halogen atoms and methylenedioxy bonded to two carbon atoms adjacent to each other on the benzene ring.

3-alkyloxy and 3-allyloxy derivatives of 2,2-diphenyl-1-allyloxypropane, and their derivatives which phenyl groups bear at least one substituent selected from the group consisting of alkyls, halogen atoms and methylenedioxy bonded to two carbon atoms adjacent to each other on the benzene ring.

α-Allyloxy and α-propargyloxy derivatives of allyl diphenylacetate, and their derivatives which phenyl groups bear at least one substituent selected from the group consisting of alkyls, halogen atoms and methylenedioxy bonded to two carbon atoms adjacent to each other on the benzene ring.

β-Allyloxy and β-propargyloxy derivatives of alkyl α,α-diphenylacetate, and their derivatives which phenyl groups bear at least one substituent selected from the group consisting of alkyls, halogen atoms and methylenedioxy bonded to two carbon atoms adjacent to each other on the benzene ring.

Allylalkyl and diallyl esters of diphenylmalonic acid, and their esters which phenyl groups bear at least one substituent selected from the group consisting of alkyls, halogen atoms and methylenedioxy bonded to two carbon atoms adjacent to each other on the benzene ring.

The chemical structures and physical properties of the typical compounds of the present invention are given below to illustrate, but not to limit, the invention.

No. of compounds:

(1) Propargyl α-phenyl-α-propargyloxy-phenylacetate

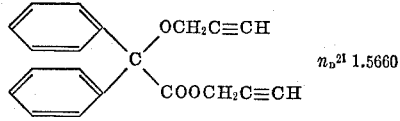

$n_D^{21}$ 1.5660

(2) Methyl α-phenyl-α-propargyloxy-phenylacetate

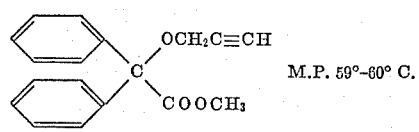

M.P. 59°–60° C.

(3) Propargyl diphenylacetate

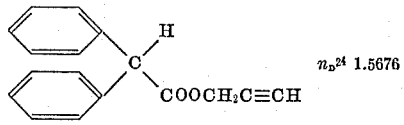

$n_D^{24}$ 1.5676

(4) Propargyl α-p-tolyl-phenylacetate

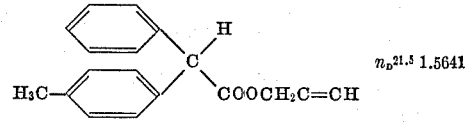

$n_D^{21.5}$ 1.5641

(5) 1,1-diphenyl-1-propargyloxy-pentane

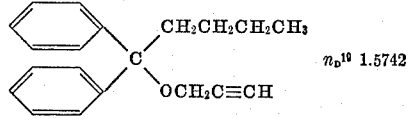

$n_D^{19}$ 1.5742

(6) Diphenylmethyl propargyl ether

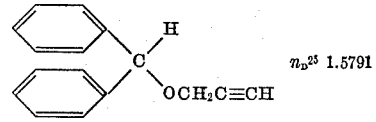

$n_D^{25}$ 1.5791

(7) 2,2-diphenyl-1-propargyloxy-ethane

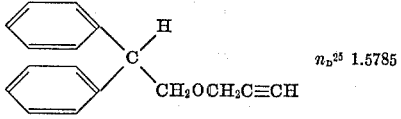

$n_D^{25}$ 1.5785

(8) 1,1-diphenyl-1,2-dipropargyloxy-ethane

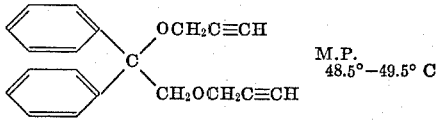

M.P. 48.5°–49.5° C (9) Propargyl α,α-diphenyl-β-propargyloxy-propionate

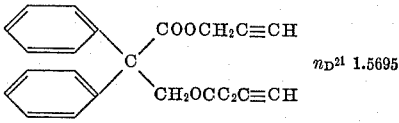

$n_D^{21}$ 1.5695

(10) Propargyl α-phenyl-α-methoxy-phenylacetate

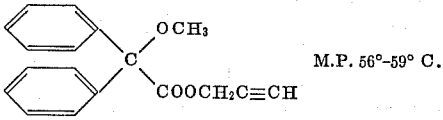

M.P. 56°–59° C.

(11) Propargyl diphenylmalonate

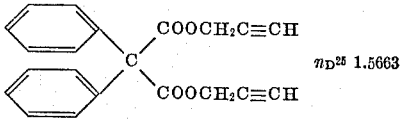

$n_D^{25}$ 1.5663

(12) 2,2-diphenyl-1,3-dipropargyloxy-propane

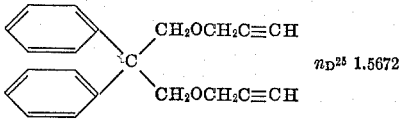

$n_D^{25}$ 1.5672

(13) Allyl α-phenyl-α-methoxy-phenylacetate

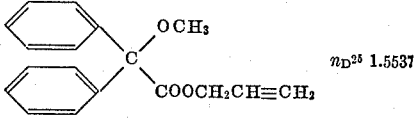

$n_D^{25}$ 1.5537

(14) 2,2-diphenyl-2-methoxy-1-propargyloxy-ethane

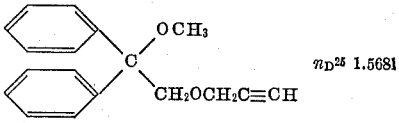

$n_D^{25}$ 1.5681

(15) 2,2-diphenyl-2-methoxy-1-allyloxy-ethane

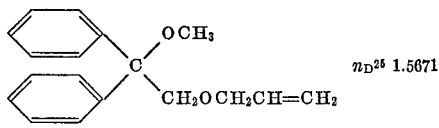

$n_D^{25}$ 1.5671

The method for producing the present compounds is further illustrated in the following examples which are, of course, not intended to limit the present invention.

EXAMPLE 1

A solution of 4.6 g. of benzilic acid in 10 cc. of anhydrous dimethylformamide was added, at room temperature with stirring, to 720 mg. of sodium hydride-paraffin (68%) admixed with 20 cc. of anhydrous dimethylformamide. After one hour, 5 g. of propargyl bromide was added to the mixture at 10° C., and then the mixture was heated at about 60° C. with continued stirring for one hour. After cooling, the reaction mixture was poured into 50 cc. of water, and was extracted three times with 50 cc. of ether. The ether solution was dried over anhydrous magnesium sulfate, and the ether was removed by distillation. Paraffin was removed from the residue to give 4.6 g. of propargyl ester of α-phenyl-α-propargyloxyphenylacetic acid, an oily substance having a refractive index of $n_D^{21}$ 1.566 after being purified by alumina column chromatography.

*Elementary analysis.*—Calculated for $C_{20}H_{16}O_3$ (percent): C, 78.95; H, 5.26. Found (percent): C, 79.06; H, 5.22.

EXAMPLE 2

A solution of 2.7 g. of propargyl ester of α-phenyl-α-hydroxyphenylacetic acid in 10 cc. of anhydrous dimethylformamide was added to 360 mg. of sodium hydride-paraffin (68%) admixed with 20 cc. of anhydrous dimethylformamide. The resultant mixture was reacted with 1.2 g. of propargyl bromide in a manner similar to that in Example 1 to give 1.9 g. of propargyl ester of α-phenyl-α-propargyl-oxyphenylacetic acid, an oily substance having a refractive index of $n_D^{21}$ 1.5663 after being purified by alumina column chromatography.

*Elementary analysis.*—Calculated for $C_{20}H_{16}O_3$ (percent): C, 78.95; H, 5.26. Found (percent): C, 78.88; H, 5.13.

EXAMPLE 3

2.5 g. of propargyl bromide was added to a solution of 5.3 g. of α-phenyl-α-propargyloxyphenylacetic acid and 2.5 g. of triethylamine in 30 cc. of dimethylformamide, and the resultant mixture was heated at 60° C. with stirring for one hour. After cooling, the reaction mixture was poured into water, followed by extraction with ether. The ether solution was dried over anhydrous magnesium sulfate, and the ether was removed by distillation to give 6.5 g. of propargyl ester of α-phenyl-α-propargyloxyphenylacetic acid, an oily substance having a refractive index of $n_D^{19}$ 1.5671 after being purified by alumina column chromatography.

*Elementary analysis.*—Calculated for $C_{20}H_{16}O_3$ (percent): C, 78.95; H, 5.26. Found (percent): C, 78.97; H, 5.20.

EXAMPLE 4

A solution of 2.4 g. of methyl α-phenyl-α-hydroxyphenylacetate in 10 cc. of anhydrous dimethylformamide was added to 360 mg. of sodium hydride-paraffin (68%) admixed with 20 cc. of anhydrous dimethylformamide. The resultant mixture was reacted with 1.5 g. of propargyl bromide in a manner similar to that in Example 1 to give 2.0 g. of methyl ester of α-phenyl-α-propargyloxyphenylacetic acid, a crystalline substance having a melting point of 59°–60° C. after being recrystallized from methanol.

*Elementary analysis.*—Calculated for $C_{18}H_{16}O_3$ (percent). C, 77.14; H, 5.71. Found (percent): C, 77.31; H, 5.65.

EXAMPLE 5

4.3 g. of propargyl bromide was added to a mixture of 4.5 g. of potassium carbonate and 6.4 g. of diphenylacetic acid in 50 cc. of acetone, the resultant mixture was refluxed for one hour. Precipitates were filtered off from the cooled reaction mixture, and the acetone was removed from the filtrate by distillation. The residual oil was dissolved in ether and washed with water. The ether solution was dried over anhydrous magnesium sulfate, and the ether was removed by distillation to give 6.9 g. of propargyl ester of diphenylacetic acid, an oily substance having a refractive index of $n_D^{24}$ 1.5676 after being purified by alumina column chromatography.

*Elementary analysis.*—Calculated for $C_{17}H_{14}O_2$ (percent): C, 81.60; H, 5.60. Found (percent): C, 81.82; H, 5.42.

EXAMPLE 6

2.7 g. of propargyl bromide was added to a solution of 4.5 g. of α-p-tolylphenylacetic acid and 2.2 g. of triethylamine in 30 cc. of dimethylformamide. The reaction was carried out in a manner similar to that in Example 3 to give 4.6 g. of propargyl ester of α-p-tolylphenylacetic acid, an oily substance having a refractive index of $n_D^{21.5}$ 1.5641 after being purified by alumina column chromatography.

*Elementary analysis.*—Calculated for $C_{18}H_{16}O_2$ (percent): C, 81.82; H, 6.06. Found (percent): C, 82.06; H, 6.13.

EXAMPLE 7

4.8 g. of 1,1-diphenyl-1-hydroxy-pentane dissolved in 10 cc. of anhydrous dimethylformamide was added to a mixture of 720 mg. of sodium hydride-paraffin (68%) and 20 cc. of anhydrous dimethylformamide. The resultant mixture was reacted with 2.7 g. of propargyl bromide in a manner similar to that in Example 1 to give 3.5 g. of 1,1-diphenyl-1-propargyloxy-pentane, an oily substance having a refractive index $n_D^{19}$ 1.5742 after being purified by alumina column chromatography.

*Elementary analysis.*—Calculated for $C_{20}H_{22}O$ (percent): C, 86.33; H, 7.91. Found (percent): C, 86.46; H, 8.03.

EXAMPLE 8

A solution of 2.3 g. of diphenylmethanol in 10 cc. of anhydrous dimethylformamide was added to a mixture of 650 mg. of sodium hydride-paraffin (50%) and 20 cc. of anhydrous dimethylformamide. The resultant mixture was reacted with 1.5 g. of propargyl bromide in a manner similar to that in Example 1 to give 1.8 g. of diphenylmethyl propargyl ether, an oily substance having a refractive index of $n_D^{28}$ 1.5791 after being purified by alumina column chromatography.

*Elementary analysis.*—Calculated for $C_{16}H_{14}O$ (percent): C, 86.49; H, 6.31. Found (percent): C, 86.61; H, 6.24.

EXAMPLE 9

A solution of 5.2 g. of 2,2-diphenyl-1-hydroxy-ethane in 15 cc. of anhydrous dimethylformamide was added to a mixture of 1.1 g. of sodium hydride-paraffin (68%) and 30 cc. of anhydrous dimethylformamide. The resultant mixture was reacted with 3.6 g. of propargyl bromide in a manner similar to that in Example 1 to give 4.4 g. of 2,2-diphenyl-1-propargyloxyethane, an oily substance having a refractive index of $n_D^{25}$ 1.5785, after being purified with alumina column chromatography.

*Elementary analysis.*—Calculated for $C_{17}H_{16}O$ (percent): C, 86.46; H, 6.78. Found (percent): C, 86.38; H, 6.51.

EXAMPLE 10

1.4 g. of propargyl bromide was added to a solution of 2.4 g. of α-phenyl-α-methoxy-phenylacetic acid and 1.1 g. of triethylamine in 20 cc. of dimethylformamide. The reaction was carried out in a manner similar to that in Example 3 to give 2.5 g. of propargyl ester of α-phenyl-α-methoxy-phenylacetic acid, a crystalline substance having a melting point of 56°–59° C. after being recrystallized from ethanol.

Elementary analysis.—Calculated for $C_{18}H_{16}O_3$ (percent): C, 77.14; H, 5.71. Found (percent): C, 77.25; H, 5.83.

EXAMPLE 11

A solution of 1,1-diphenylethane-1,2-diol in 10 cc. of anhydrous dimethylformamide was added to a mixture of 720 mg. of sodium hydride-paraffin (68%) and 20 cc. of anhydrous dimethylformamide. The resultant mixture was reacted with 2.5 g. of propargyl bromide in a manner similar to that in Example 1 to give 1.7 g. of 1,1-diphenyl-1,2-dipropargyloxyethane, a crystalline substance having a melting point of 48.5°–49.5° C. after being recrystallized from ethanol.

Elementary analysis.—Calculated for $C_{20}H_{18}O_2$ (percent): C, 82.76; H, 5.92. Found (percent): C, 82.61; H, 5.78.

EXAMPLE 12

A solution of 4.8 g. of 2,2-diphenyl-3-hydroxypropionic acid in 10 cc. of anhydrous dimethylformamide was added to a mixture of 1.5 g. of sodium hydride-paraffin (68%) and 30 cc. of anhydrous dimethylformamide. The resultant mixture was reacted with 5.0 g. of propargyl bromide in a manner similar to that in Example 1 to give 4.0 g. of propargyl ester of 2,2-diphenyl-3-propargyloxypropionic acid, an oily substance having a refractive index of $n_D^{21}$ 1.5695, after being purified by alumina column chromatography.

Elementary analysis.—Calculated for $C_{21}H_{18}O_3$ (percent): C, 79.25; H, 5.66. Found (percent): C, 79.38; H, 5.55.

EXAMPLE 13

2.4 g. of propargyl bromide was added to a solution of 2.3 g. of diphenylmalonic acid and 1.0 g. of triethylamine in 20 cc. of dimethylformamide. The reaction was carried out in a manner similar to that in Example 3 to give 2.5 g. of propargyl ester of diphenylmalonic acid, an oily substance having a refractive index of $n_D^{25}$ 1.5663.

Elementary analysis.—Calculated for $C_{21}H_{16}O_4$ (percent): C, 75.90; H, 4.82. Found (percent): C, 74.98; H, 5.42.

EXAMPLE 14

A solution of 2,2-diphenyl-1,3-dihydroxypropane in 10 cc. of anhydrous dimethylformamide was added to a mixture of 1.5 g. of sodium hydride-paraffin (68%) and 20 cc. of anhydrous dimethylformamide. The resultant mixture was reacted with 5.2 g. of propargyl bromide in manner similar to that in Example 1 to give 4.7 g. of 2,2-diphenyl-1,3-dipropargyloxypropane, an oily substance having a refractive index of $n_D^{25}$ 1.5672.

Elementary analysis.—Calculated for $C_{21}H_{20}O_2$ (percent): C, 82.89; H, 6.58. Found (percent): C, 82.30; H, 6.41.

EXAMPLE 15

1.4 g. of allyl bromide was added to a solution of 2.4 g. of α-phenyl-α-methoxy-phenylacetic acid and 1.1 g. of triethylamine in 20 cc. of dimethylformamide. The reaction was carried out in a manner similar to that in Example 3 to give 2.6 g. of allyl ester of α-phenyl-α-methoxyphenylacetic acid, an oily substance having a refractive index of $n_D^{25}$ 1.5537

Elementary analysis.—Calculated for $C_{18}H_{18}O_3$ (percent): C, 76.60; H, 6.38. Found (percent): C, 76.43; H, 6.52.

EXAMPLE 16

A solution of 2,2-diphenyl-2-methoxy-1-hydroxy-ethane in 10 cc. of anhydrous dimethylformamide was added to a mixture of 1.2 g. of sodium hydride-paraffin (68%) and 20 cc. of anhydrous dimethylformamide. The resultant mixture was reacted with 3.9 g. of propargyl bromide in manner similar to that in Example 1 to give 6.8 g. of 2,2 - diphenyl-2-methoxy-1-propargyloxy-ethane, an oily substance having a refractive index of $n_D^{25}$ 1.5681.

Elementary analysis.—Calculated for $C_{18}H_{18}O_2$ (percent): C, 81.20; H, 6.77. Found (percent): C, 80.97; H, 6.63.

EXAMPLE 17

A solution of 2,2-diphenyl-2-methoxy-1-hydroxyethane in 10 cc. of anhydrous dimethylformamide was added to a mixture of 1.2 g. of sodium hydride-paraffin (68%) and 20 cc. of anhydrous dimethylformamide. The resultant mixture was reacted with 4.0 g. of allyl bromide in manner similar to that in Example 1 to give 7.3 g. of 2,2-diphenyl-2-methoxy-1-allyloxyethane, an oily substance having a refractive index of $n_D^{25}$ 1.5671.

Elementary analysis.—Calculated for $C_{18}H_{20}O_2$ (percent): C, 80.60; H, 7.46. Found (percent): C, 80.83; H, 7.12.

EXAMPLE 18

A solution of 6.5 g. of ethyl α-(p-chlorophenyl)-α-hydroxy-p-chlorophenylacetate in 10 cc. of anhydrous dimethylformamide was added to a mixture of 0.7 g. of 68% sodium hydride-paraffin and 20 cc. of anhydrous dimethylformamide.

The mixture was reacted with 3.0 g. of propargyl bromide in manner similar to that in Example 1 to give 5.2 g. of ethyl α-(p-chlorophenyl)-α-propargyloxy-p-chlorophenylacetate, $n_D^{25}$ 1.5651.

Elementary analysis.—Calculated for $C_{19}H_{16}O_3Cl_2$ (percent): C, 62.81; H, 4.41; Cl, 19.56. Found (percent): C, 62.56; H, 4.18; Cl, 19.81.

EXAMPLE 19

A solution of 6.0 g. of α-(p-chlorophenyl)-α-hydroxy-p-chlorophenylacetic acid in 10 cc. of anhydrous dimethylformamide was added to a mixture of 1.5 g. of 68% sodium hydride-paraffin and 20 cc. of anhydrous dimethylformamide. The mixture was reacted with 6.0 g. of propargyl bromide in manner similar to that in Example 1 to give 4.8 g. of propargyl α-(p-chlorophenyl)-α-propargyloxy-p-chlorophenylacetate, $n_D^{25}$ 1.5735.

Elementary analysis.—Calculated for $C_{10}H_{14}O_3Cl_2$ (percent): C, 64.34; H, 3.75; Cl, 19.03. Found (percent): C, 64.18; H, 3.56; Cl, 19.43.

EXAMPLE 20

A solution of 5.2 g. of α-phenyl-α-methoxyphenylacetic acid chloride in 15 cc. of dry benzene was added to a solution of 1.2 g. of propargyl alcohol in 2.4 g. of pyridine and 20 cc. of dry benzene was sufficiently mixed and allowed to stand overnight at room temperature.

Thereafter, the reaction mixture was washed with 5% aqueous hydrochloric acid, 5% sodium carbonate and saturated sodium chloride solution in order and evaporation of the solvents employed gave 5.1 g. of pale yellow crystals.

These crystals were recrystallized from ethanol to give white crystals having M.P. 56°–59° C.

Elementary analysis.—Calculated for $C_{18}H_{16}O_3$ (percent): C, 77.14; H, 5.71. Found (percent): C, 77.21; H, 5.85.

EXAMPLE 21

A solution of 5.2 of α-phenyl-α-methoxyphenylacetic acid chloride in 15 cc. of dry benzene was added to a solution of 1.2 g. of allyl alcohol and 2.4 g. of dry pyridine in 2.4 g. of dry benzene.

The mixture was sufficiently mixed and allowed to stand overnight.

Thereafter, the reaction mixture was treated in manner similar to that in Example 20 to give 5.2 g. of allyl α-phenyl-α-methoxyphenylacetate, $n_D^{25}$ 1.5532.

*Elementary analysis.*—Calculated for $C_{18}H_{18}O_3$ (percent): C, 76.60; H, 6.38. Found (percent): C, 76.49; H, 6.48.

EXAMPLE 22

A mixture of 5.0 g. of α-phenyl-α-methoxyphenyl acetic acid, 1.2 g. of allyl alcohol and 0.2 g. of p-toluenesulfonic acid was added to 50 cc. of benzene.

The mixture was heated under reflux for 8 hours in an apparatus equipped with a rectification tower to separate water removed.

After cooling, the reaction mixture was washed with 5% aqueous sodium carbonate solution and saturated sodium chloride solution in order and dried over anhydrous magnesium sulfate.

Evaporation of the solvent employed gave 4.0 g. of allyl α-phenyl-α-methoxyphenylacetate, $n_D^{25}$ 1.5530.

*Elementary analysis.*—Calculated for $C_{18}H_{18}O_3$ (percent): C, 76.60; H, 6.38. Found (percent): C, 76.41; H, 6.43.

EXAMPLE 23

A mixture of 4.7 g. of α-phenyl-α-methoxyphenyl acetic acid anhydride and 1.2 g. of allyl alcohol was added to 50 cc. of benzene and the mixture was heated for 4 hours under reflux.

After cooling, the reaction mixture was washed with 5% aqueous sodium carbonate solution and saturated sodium chloride solution in order, and dried over anhydrous magnesium sulfate.

Evaporation of the solvent employed gave 4.5 g. of allyl α-phenyl-α-methoxyphenylacetate, $n_D^{25}$ 1.5533.

*Elementary analysis.*—Calculated for $C_{18}H_{18}O_3$ (percent): C, 76.60; H, 6.38. Found (percent): C, 76.37; H, 6.21.

EXAMPLE 24

A solution of 6.6 g. of propargyl α-phenyl-α-bromophenylacetate in 20 cc. of ethanol was added to a solution of 1.1 g. of sodium methylate in 30 cc. of methanol.

The mixture was heated for 2 hours under reflux, thereafter cooled, poured onto water and extracted with ether.

The ether layer was washed with 5% aqueous hydrochloric acid solution, 5% aqueous sodium carbonate and saturated sodium chloride solution in order and dried over anhydrous magnesium sulfate.

Evaporation of ether gave 5.2 g. of propargyl-α-phenyl-α-methoxyphenylacetate as pale yellow crystals, which were recrystallized from ethanol to give white crystals, M.P. 56°–59° C.

*Elementary analysis.*—Calculated for $C_{18}H_{16}O_3$ (percent): C, 77.14; H, 5.71. Found (percent): C, 77.20; H, 5.78.

EXAMPLE 25

A mixture of 4.6 g. of benzilic acid, 2.2 g. of triethylamine and 30 cc. of dimethlyformamide was added with 2.4 g. of propargyl bromide.

The mixture was treated in same way as in Example 3 to give 4.5 g. of propargyl benzilate, $n_D^{25}$ 1.5704.

*Elementary analysis.*—Calculated for $C_{17}H_{14}O_3$ (percent): C, 76.69; H, 5.26. Found (percent): C, 76.52; H, 5.39.

EXAMPLE 26

A solution of 1.2 g. of propargyl alcohol, 2.4 g. of dry pyridine in 20 cc. of dry benzene was added with a solution of 7.1 g. of α-phenyl-α-bromophenyl acetic acid bromide in 15 cc. of dry benzene.

The mixture was sufficiently mixed and allowed to stand overnight.

The reaction mixture was treated in same way as in Example 20 to give 5.2 g. of propargyl α-phenylα-bromophenylacetate. The white crystals recrystallized from benzene showed M.P. 68°–70° C.

*Elementary analysis.*—Calculated for $C_{17}H_{13}BrO_2$ (percent): C, 62.01; H, 3.95; Br, 24.32. Found (percent): C, 62.13; H, 3.86; Br, 24.11.

EXAMPLE 27

A solution of 5.4 g. of propargyl benzilate in 50 cc. of benzene was added with 1.5 g. of phosphorus tribromide.

The mixture was heated for 2 hours under reflux.

After cooling, the reaction mixture was washed with 5% aqueous sodium carbonate solution and saturated sodium chloride solution in order, and dried over anhydrous magnesium sulfate.

Evaporation of the solvent employed gave 5.0 g. of propargyl α-phenyl-α-bromophenylacetate.

The white crystals recrystallized from benzene showed M.P. 68°–70° C.

*Elementary analysis.*—Calculated for $C_{17}H_{13}BrO_2$ (percent): C, 62.01; H, 3.95; Br, 24.32. Found (percent): C, 62.22; H, 3.83; Br, 24.26.

EXAMPLE 28

A solution of 4.8 g. of α-phenyl-α-methoxyphenyl acetic acid in 50 cc. of benzene was added with 1.5 g. of phosphorus trichloride.

The mixture was heated for 2 hours under reflux. After removing precipitates the benzene layer was condensed to give 4.6 g. of crude α-phenyl-α-methoxyphenyl acetic acid chloride.

*Elementary analysis.*—Calculated for $C_{15}H_{13}ClO_2$ (percent): C, 69.10; H, 4.99; Cl, 13.63. Found (percent): C, 69.43; H, 4.65; Cl, 13.92.

It has hitherto been known that sesamin and related compounds contained in the sesame oil have enhancing action on the potency of an insecticide of the pyrethroid type. These compounds have little insecticidal activity when used alone, but it has been recognized that they can markedly enhance the effectiveness of an insecticide of the pyrethroid type when admixed with the latter in a suitable proportion. This enhancing action is generally called a synergetic effect, and the agent which exerts said effect is called a synergist.

Since sesamin and related compounds have a methylenedioxy-phenyl group in their molecule, various compounds which have said group in the molecule were synthesized. As the synergist for pyrethrins, there are now widely used α-[2-(2 - butoxyethoxy)ethoxy]-4,5-methylenedioxy-2-propyltoluene (hereinafter referred to as piperonyl butoxide), 1,2 - methylenedioxy-4-[2-(octylsulfinyl)propyl]benzene (hereinafter referred to as sulfoxide), 4-(3,4 - methylenedioxy-phenyl) - 5 - methyl-1,3-dioxane (hereinafter referred to as a safroxane), etc. There are other kinds of synergist on the market including N-(2-ethylhexyl)-bicyclo-[2,2,1]-hept - 5 - ene-anhydrophthalic acid-2,3-dicarboxyimide (trade name: MGK–264, McLaughlin Gormley King Co.), etc. The most widely used piperonyl butoxide shows a remarkable synergetic effect upon natural pyrethrins, whilst the effect upon allethrin is somewhat inferior. MGK–264 behaves in the way opposite to piperonyl butoxide. Thus every known synergist has both advantage and disadvantage.

However, according to the present invention, the diphenylmethane derivatives first synthesized by the present inventors have remarkable synergetic effect upon natural pyrethrins as well as upon allethrin, said effect upon allethrin being superior to that of piperonyl butoxide. Also, the present compounds have a remarkable synergetic effect upon other members of insecticides of the cyclopropanecarboxylic ester type, including the one formerly invented by the present inventors. Moreover, the present compounds show a remarkable synergetic effect upon an insecticide of the carbamate type such as 1-naphthyl N-methylcarbamate (hereinafter referred to as carbaryl), as is the case usually with other known synergists for insecticides of the pyrethroid type, for example, piperonyl butoxide.

Following experiment illustrates the effectiveness of the present compounds as the synergists for insecticides of the cyclopropanecarboxylic acid ester and carbamate types.

EXPERIMENT

Biological test solutions in acetone were prepared from natural pyrethrins, allethrin, N-(chrysanthemoxymethyl)-3,4,5,6-tetrahydrophthalimide (hereinafter referred to as phthalthrin) and carbaryl, each alone or each with the addition of 5 times each weight of piperonyl butoxide or of the compounds from No. 1 to No. 15. The insecticidal activity was tested by dropping a minute amount of the test solution from a microsyringe onto the notum of a housefly (*Musca domestica*). The 50% lethal doses ($LD_{50}$) after 24 hours were as shown in the following table.

TABLE OF INSECTICIDAL ACTIVITIES

| Insecticide | Synergist | $LD_{50}$ ($\gamma$/fly) | Relative enhancement of insecticidal activity |
|---|---|---|---|
| Phthalthrin | | 0.49 | 1.0 |
| Do | Piperonyl butoxide | 0.115 | 4.3 |
| Do | Compound 1 | 0.038 | 13.2 |
| Do | Compound 2 | 0.065 | 7.5 |
| Do | Compound 3 | 0.09 | 5.5 |
| Do | Compound 4 | 0.10 | 4.9 |
| Do | Compound 5 | 0.10 | 4.9 |
| Do | Compound 6 | 0.11 | 4.5 |
| Do | Compound 7 | 0.095 | 5.2 |
| Do | Compound 8 | 0.06 | 8.2 |
| Do | Compound 9 | 0.05 | 9.8 |
| Do | Compound 10 | 0.030 | 16.3 |
| Do | Compound 11 | 0.034 | 14.4 |
| Do | Compound 12 | 0.044 | 11.1 |
| Do | Compound 13 | 0.104 | 4.7 |
| Do | Compound 14 | 0.042 | 11.7 |
| Do | Compound 15 | 0.091 | 5.4 |
| Natural pyrethrins | | 0.35 | 1.0 |
| Do | Piperonyl butoxide | 0.07 | 5.0 |
| Do | Compound 1 | 0.06 | 5.8 |
| Do | Compound 2 | 0.08 | 4.4 |
| Do | Compound 9 | 0.05 | 7.0 |
| Do | Compound 10 | 0.043 | 8.1 |
| Allethrin | | 0.54 | 1.0 |
| Do | Piperonyl butoxide | 0.17 | 3.2 |
| Do | Compound 1 | 0.065 | 8.3 |
| Do | Compound 6 | 0.11 | 4.9 |
| Do | Compound 7 | 0.12 | 4.5 |
| Do | Compound 8 | 0.09 | 6.0 |
| Do | Compound 10 | 0.061 | 8.9 |
| Carbaryl | | >5 | 1.0 |
| Do | Piperonyl butoxide | 0.21 | >23.8 |
| Do | Compound 1 | 0.14 | >32.1 |
| Do | Compound 8 | 0.17 | >29.4 |
| Do | Compound 10 | 0.10 | >50 |
| Do | Compound 13 | 0.20 | >25 |
| | Compound 1 | >2 | |
| | Compound 2 | >2 | |
| | Compound 3 | >2 | |
| | Compound 4 | >2 | |
| | Compound 5 | >2 | |
| | Compound 6 | >2 | |
| | Compound 7 | >2 | |
| | Compound 8 | >2 | |
| | Compound 9 | >2 | |
| | Compound 10 | >2 | |
| | Compound 11 | >2 | |
| | Compound 12 | >2 | |
| | Compound 13 | >2 | |
| | Compound 14 | >2 | |
| | Compound 15 | >2 | |

The above example provides a definite evidence for the effectiveness of the compounds of the present invention as the synergists for insecticides of the cyclopropanecarboxylic ester type and carbamate type.

As the examples of insecticides of the cyclopropanecarboxylic type and carbamate type which are enhanced in effectiveness by diphenylmethane derivatives of the present invention, following compounds may be cited though the scope of insecticides which are susceptible to the synergetic effect of the present compounds is not limited to these examples.

Natural pyrethrins; allethrin; phthalthrin (3,4,5,6-tetrahydrophthalimidomethyl chrysanthemate); 3′,4′,5′,6′-tetrahydrophthalimidomethyl - 2,2,3,3 - tetramethylcyclopropane - 1 - carboxylate; N-(chrysanthemoxymethyl)-phthalimide; N - (chrysanthemoxymethyl) - monothiophthalimide; N - (chrysanthemoxymethyl)-dimethylmaleimide; 6 - chrysanthemoxymethyl-Tetralin; 3′ - allyl - 2′-methyl - 4′ - oxo - 2′ - cyclopentenyl-2,2,3,3-tetramethylcyclopropane - 1 - carboxylate; 5-benzyl-3-furylmethyl-chrysanthemate [hereinafter referred to as "Chrysron" (registered trademark, Sumitomo Chemical Co., Ltd.)]; 5′-benzyl - 3′ - furylmethyl-2,2,3,3-tetramethylcyclopropane-1 - carboxylate and other substituted furfuryl esters of cyclopropanecarboxylic acid; 5′ - benzyl-2′-thenyl-2,2,3,3-tetramethylcyclopropane-1-carboxylate; 5-benzyl-2-thenyl-chrysanthemate; dimethrin; 3 - phenoxybenzylchrysanthemate; 3′ - phenoxybenzyl - 2,2,3,3-tetramethylcyclopropane - 1 - carboxylate; 3 - benzylbenzylchrysanthemate; 3′ - benzylbenzyl - 2,2,3,3 - tetramethylcyclopropane-1-carboxylate and other substituted benzyl ester of cyclopropanecarboxylic acid; carbaryl; 3,4-dimethylphenyl-N-methylcarbamate [hereinafter referred to as "Meobal" (registered trademark, Sumitomi Chemical Company, Ltd.)]; 3,5 - dimethylphenyl-N-methylcarbamate (hereinafter referred to as Cosban); 2-sec-butylphenyl-N-methylcarbamate (hereinafter referred to as Bassa).

Compositions comprising one or more insecticides of the cyclopropanecarboxylic ester type and the carbamate type, as the active ingredients, and, in addition, one or more diphenylmethane derivatives of the present invention in an amount of 0.5 to 50 times the weight of said active ingredients, are specifically effective in controlling sanitary pests such as house-flies, mosquitoes, cockroaches; rice plant pests upon as rice stem borers, planthoppers, leafhoppers; lepidopterous larvae, which are injurious to fruit-trees and vegetables, such as larvae of cabbage worms, armyworms, diamond-back moths, cutworms, etc.; plants parasitic mites; pantry pests such as rice weevils, almond moths, etc. Furthermore, said compositions are also effective in controlling other agricultural and sanitary pests, forest pests, and pests for horticulture.

In preparing the insecticidal compositions according to the present invention, the active insecticides of the cyclopropanecarboxylic ester type or the carbamate type, and the novel synergists of diphenylmethane derivatives are directly formulated by use of usual adjuvants for insecticides into all forms, such as oil sprays, emulsifiable concentrates, wettable powders, dusts, granules, aerosols, mosquito coil, fumigants, dusts containing baits and other attractants, solid preparations, and any other form, although in some cases it is more convenient for formulation to use the active ingredients and synergists dissolved in advance in suitable solvents such as xylene, methylnaphthalene, acetone, trichloroethane, etc.

For special uses, the insecticidal activities of said compositions can be further enhanced by being incorporated simultaneously with piperonyl butoxide, sulfoxide, sufroxane, NGK–264 and other known synergists for pyrethroids, etc.

Multipurpose compositions can be formulated with said insecticidal compositions by the incorporation with other active ingredients such as organochlorine or organophosphorus insecticides, fungicides, miticides, herbicides, fertilizers, and ohter agricultural chemicals.

The preparative method and the effectiveness of the present insecticidal compositions will be further illustrated in the following Examples 29 to 51, and Test Examples 1 to 10, these examples being, needless to say, not intended to limit the scope of the present invention.

In the examples, the numerals in the parentheses show the aforementioned numbers representing the present compounds, and all parts are by weight.

EXAMPLE 29

A mixture of 0.05 part of phthalthrin and 0.25 part of any one of the Compounds (1), (2), (3), (8), (9), (10) and (11) was dissolved in 2 parts of xylene, and was made up to 100 parts by the addition of deodorized kerosene to obtain each oil spray.

EXAMPLE 30

A mixture of 0.1 part of N-(chrysanthemoxymethyl)-dimethylmaleimide, 0.3 part of the Compound (4) and 0.2 part of piperonyl butoxide was dissolved in 5 parts of xylene, and was made up to 100 parts by the addition of deodorized kerosene to obtain an oil spray.

EXAMPLE 31

A mixture of 0.1 part of allethrin and 0.5 part of any one of the Compounds (1), (2), (5), (6) and (10) was dissolved in 2 parts of xylene and was made up to 100 parts by the addition of deodorized kerosene to obtain each oil spray.

EXAMPLE 32

A mixture of 0.05 part of Chrysron and 0.25 part of any one of the Compounds (1), (2), (7), (8), (9), (10), (11) and (13) was dissolved in 2 parts of xylene, and was made up to 100 parts by the addition of deodorized kerosene to obtain each oil spray.

EXAMPLE 33

A mixture of 0.035 part of phthalthrin, 0.015 part of Chrysron and 0.15 part of the Compound (1) was dissolved in 2 parts of xylene and was made up to 100 parts by the addition of deodorized kerosene to obtain an oil spray.

EXAMPLE 34

1.5 parts of a pyrethrum extract (containing 20% of pyrethrins), 1.5 parts of the Compound (1), 1 part of DDT, 5 parts of xylene, and 6 parts of deodorized kerosene were mixed together and charged in an aerosol container with removed valve. After being fitted with the valve, the container was charged through the valve with 85 parts of a propellant (liquefied petroleum gas) under pressure to obtain an aerosol preparation.

EXAMPLE 35

0.35 part of phthalthrin, 0.05 part of Chrysron, 1 part of the Compound (2), 6.6 parts of xylene, and 7 parts of deodorized kerosene were mixed together and charged in an aerosol container with removed valve. After being fitted with the valve, the container was charged through the valve with 85 parts of a propellant (liquefied petroleum gas) under pressure to obtain an aerosol preparation.

EXAMPLE 36

12.5 parts of deodorized kerosene and 1 part of an emulsifier "Atmos-300" (registered trademark, Atlas Chemical Industries, Inc.) were added to a mixture of 0.3 part of phthalthrin, 0.2 part of 3-phenoxybenzyl chrysanthemate, 0.5 part of piperonyl butoxide, and 0.5 part of the Compound (1), and the whole mixture was emulsified in 50 parts of purified water. The resultant emulsion was charged in an aerosol container together with 35 parts of a mixture (3:1) of deodorized butane and deodorized propane to obtain a water-based aerosol.

EXAMPLE 37

A solution of 0. part of phthalthrin and 1.5 parts of any one of the Compounds (1), (2), (8), (10), (12), (14) and (15) in 20 parts of acetone was added to 98.2 parts of diatomaceous earth (300 mesh), and thoroughly mixed by grinding in a mortar. Thereafter, the acetone was removed by evaporation to give a dust preparation.

EXAMPLE 38

A mixture of 1 part of Meobal and 3 parts of any one of the Compounds (1), (3), (6), (7) and (10) was dissolved in 20 parts of acetone. Each solution was added with 96 parts of talc (200 mesh) and thoroughly mixed by grinding in a mortar. Thereafter, the acetone was removed by evaporation to give each dust preparation.

EXAMPLE 39

A mixture of 1 part of Bassa and 2 parts of each of the Compounds (8), (9), (11) and (14) was dissolved in 20 parts of acetone. Each solution was added with 97 parts of talc (200 mesh) and thoroughly mixed by grinding in a mortar. Thereafter, the acetone was removed by evaporation to give each dust preparation.

EXAMPLE 40

5 parts of phthalthrin, 20 parts of the Compound (1), 15 parts of "Sorpol SM-200," and 55 parts of xylene were emulsifier produced by Toho Chemical Co.), and 60 parts of xylene were mixed together by thorough stirring to give an emulsifiable concentrate.

EXAMPLE 41

5 parts of allethrin, 25 parts of the Compound (4), 15 parts of "Sorpol SM-200," and 55 parts of xylene were mixed together by thorough stirring to give an emulsifiable concentrate.

EXAMPLE 42

5 parts of Chrysron, 25 parts of the Compound (2), 15 parts of "Sorpol SM-200," and 55 parts of xylene were mixed together with stirring to give an emulsifiable concentrate.

EXAMPLE 43

15 parts of phthalthrin, 5 parts of Chrysron, 30 parts of the Compound (6), and 5 parts of "Sorpol SM-200" were well mixed together and were added with 45 parts of talc (300 mesh). The whole mixture was ground thoroughly in a mortar to give a wettable powder.

EXAMPLE 44

0.4 g. of allethrin and 1.2 g. of any one of the Compounds (1), (10) and (13) were dissolved in 20 ml. of methanol. The solution was admixed with 98.4 g. of a carrier for mosquito coils (Tobu powder:pyrethrum marc: wood flour=3:5:1) with thorough stirring. After the removal of methanol, the mixture was thoroughly kneaded with 150 ml. of water, formed into rods, and dried to give mosquito coils.

EXAMPLE 45

A solution of 0.2 g. of Chrysron and 0.8 g. of the Compound (1) in appropriate quantity of chloroform was adsorbed uniformly on the surface of an asbestos sheet, 2.5 cm. x 1.5 cm. in size and 0.3 mm. in thickness, and covered with an asbestos sheet of the same size to give a fumigatory insecticidal composition on fibrous supports for use on an electrically heated plate. As the fibrous supports, may be used other equivalent materials such as a pulp sheet.

EXAMPLE 46

15 parts of 3'-phenoxybenzyl-2,2,3,3-tetra-methylcyclopropane-1-carboxylate, 35 parts of the Compound (2), and 5 parts of "Sorpol SM-200" were well mixed together, and 45 parts of talc (300 mesh) were added to the mixture. The whole mixture was ground thoroughly in a mortar to give a wettable powder.

EXAMPLE 47

5 parts of 6-chrysanthemoxymethyl-Tetralin, 15 parts of the Compound (5), 2 parts of O,O-dimethyl-O-(3-methyl-4-nitrophenyl) thiophosphate, 10 parts of "Sorpol SM-200," and 68 parts of xylene were thoroughly mixed with stirring to give an emulsifiable concentrate.

EXAMPLE 48

5 parts of "Toyo-Lignin CT" (registered trademark, Toyo Spinning Co.) and 75 parts of "GSM Clay" (registered trademark, Zieglight Kogyo Co.; siliceous clay) were added to a mixture of 5 parts of dimethrin and 15 parts of the Compound (7), and the resultant mixture was thoroughly mixed by grinding in a mortar. After the addition of 10% of water based on the weight of said ground mixture and further grinding in the mortar, the ground mass was granulated by means of a granulator, and dried in a current of air to give a granular composition.

EXAMPLE 49

0.4 part of phthalthrin, 2 parts of the Compound (10), 6 parts of xylene and 6.6 parts of deodorized kerosense were mixed and the mixture was treated according to the same way as in Example 17, to obtain aerosol.

EXAMPLE 50

0.3 part of phthalthrin, 0.05 part of Chrysron, 0.7 part of the Compound (10), 6 parts of xylene and 7.95 parts of deodorized kerosene were mixed and the mixture was treated according to the same way as in Example 17, to obtain aerosol.

EXAMPLE 51

5 parts of phthalthrin, 20 parts of the Compound (10), 15 parts of Sorpol SM-200 and 60 parts of xylene were mixed and the mixture was treated according to the same way as in Example 23, to obtain emulsifiable concentrates.

The insecticidal activities of the compositions of the present invention, which were prepared as described in the above examples, were as shown in the following test examples.

TEST EXAMPLE 1

The insecticidal activities of the oil spray preparations obtained in Examples 29 to 33 were tested against house fly adults by Campbel's turn-table method [Soap and Sanitary Chemicals, vol. 14, No. 6, p. 119 (1938)]. A group of about 100 adults of house fly (*Musca domestica*) was exposed to the descending spray of 5 ml. of each composition. After 10 minutes of exposure, the flies were taken out and fed in another constant temperature room at 27° C. After 24 hours, the alive and dead were observed and the percentage mortality was calculated. The results obtained were as shown in Table 1.

TABLE 1

| Ex. No. | Oil spray compositions | | Mortality (percent) |
|---|---|---|---|
| | Insecticide, percent | Synergist, percent | |
| 29 | Phthalthrin, 0.05 | Compound 1, 0.25 | 99 |
| | do | Compound 2, 0.25 | 95 |
| | do | Compound 3, 0.25 | 90 |
| | do | Compound 8, 0.25 | 92 |
| | do | Compound 9, 0.25 | 95 |
| | do | Compound 10, 0.25 | 100 |
| | do | Compound 11, 0.25 | 100 |
| 30 | N-(chrysanthemoxy-methyl) dimethyl-maleimide, 0.1 | Mixture of Compound 4, 0.3; piperonyl butoxide, 0.2. | 92 |
| 31 | Allethrin, 0.1 | Compound 1, 0.5 | 98 |
| | do | Compound 2, 0.5 | 95 |
| | do | Compound 5, 0.5 | 90 |
| | do | Compound 6, 0.5 | 92 |
| | do | Compound 10, 0.5 | 100 |
| 32 | Chrysron, 0.05 | Compound 1, 0.25 | 100 |
| | do | Compound 2, 0.25 | 100 |
| | do | Compound 7, 0.25 | 98 |
| | do | Compound 8, 0.25 | 100 |
| | do | Compound 9, 0.25 | 100 |
| | do | Compound 10, 0.25 | 100 |
| | do | Compound 11, 0.25 | 100 |
| | do | Compound 13, 0.25 | 100 |
| 33 | Mixture of phthalthrin, 0.035; Chrysron, 0.015. | Compound 1, 0.15 | 98 |
| | Allethrin, 0.2 | | 81 |

TEST EXAMPLE 2

The insecticidal activities of aerosols obtained in Examples 34 to 36, 49 and 50 were tested against house fly adults by use of Peet and Grady's Chamber (6 ft.$^3$) for testing aerosols [Soap and Chemical Specialities, Blue Book (1965)]. The results obtained were as shown in Table 2.

TABLE 2

| Aerosol composition | Rate of application (g./1,000 ft.$^3$) | Knockdown (percent) at— | | | Mortality (percent) |
|---|---|---|---|---|---|
| | | 5 minutes | 10 minutes | 15 minutes | |
| Example 34 | 3.1 | 35 | 70 | 90 | 89 |
| Example 35 | 3.1 | 40 | 79 | 94 | 94 |
| Example 36 (water-base) | 3.0 | 45 | 80 | 96 | 92 |
| Example 49 | 3.2 | 46 | 85 | 98 | 90 |
| Example 50 | 2.9 | 34 | 78 | 98 | 96 |

TEST EXAMPLE 3

Dust preparations obtained in Examples 37 and 38 were applied uniformly on the bottom surface of the deep Petri dishes at a rate of 2 g./m.$^2$. The inner surface of the wall except for 1 cm. from the bottom was coated with butter. A group of 10 adults of German cockroach (*Blattella germanica*) was released into each dish to be contacted with the insecticide for 10 minutes, and the percentage knockdown was observed. Then the cockroaches were transferred into insecticide-free containers and fed for 3 days to observe, thereafter, the alive and dead. The results obtained were as shown in Table 3.

TABLE 3

| Ex. No. | Dust compositions | | Falldown 10 min. (percent) | Mortality (percent) |
|---|---|---|---|---|
| | Insecticide, percent | Synergist, percent | | |
| 37 | Phthalthrin, 0.3 | Compound 1, 1.5 | 100 | 100 |
| | do | Compound 2, 1.5 | 100 | 95 |
| | do | Compound 8, 1.5 | 100 | 100 |
| | do | Compound 10, 1.5 | 100 | 100 |
| | do | Compound 12, 1.5 | 100 | 98 |
| | do | Compound 14, 1.5 | 100 | 92 |
| | do | Compound 15, 1.5 | 100 | 90 |
| 38 | Meobal, 1.0 | Compound 1, 3.0 | 85 | 100 |
| | do | Compound 10, 3.0 | 90 | 100 |

TEST EXAMPLE 4

About 20 rice seedlings, cultivated for 20 days after sowing in a flower pot of 8.5 cm. in diameter, were dusted by means of a bell jar duster with 300 mg./pot of a dust preparation obtained in Examples 21 to 23. After 4 minutes of exposure, the pot was entirely enclosed in wire gauze. More than 90% of 20 adults of brown planthopper (*Nilaparvata lugens*), which had been released into said enclosure, were found dead after 24 hours.

TEST EXAMPLE 5

About 50 adults of house fly (*Musca domestica*), which had been released into a glass chamber of 70 cm.$^3$ in volume, were sprayed with 0.7 ml. of an emulsion prepared by diluting an emulsifiable concentrate obtained in Examples 40 to 42 and 51, with water to 1/50 concentration, by means of a glass atomizer under a pressure of 20 lbs. In 10 minutes, more than 90% of the flies were knocked down, and more than 90% of the flies knocked down were found dead on the following day.

TEST EXAMPLE 6

Rice plants, which had been cultivated for 45 days after sowing in Wagner pots (1/50,000), were sprayed with a diluted emulsion (diluted with 200 times water) of the emulsifiable concentrates obtained in Example 42, or with a solution (in 500 times water) of any one of the wettable powders obtained in Examples 43 and 46, at a rate of 10 ml. per pot. Then each pot was enclosed in wire gauze, into which 30 adult green rice leafhoppers (*Nephotettix cincticeps*) were released. More than 90% of the leafhoppers were found dead in one day.

TEST EXAMPLE 7

In a glass chamber (70 cm. x 70 cm. x 70 cm.), 50 adults of northern house mosquito (*Culex pipiens pallens*) were exposed to the fumes generated by any one of the coils obtained in Example 44, which had been ignited at both ends. In every case, more than 80% of the mosquitoes were knocked down in 20 minutes.

TEST EXAMPLE 8

In a glass chamber (70 cm. x 70 cm. x 70 cm.), 50 adult house flies were exposed to the fumes generated by the fumigatory insecticidal composition obtained in Example 45, which had been placed on an electrically heated plate. In 20 minutes, more than 80% of the flies were knocked down.

TEST EXAMPLE 9

2 litres of a diluted emulsion (diluted with 40,000 times water) of any one of the emulsifiable concentrates obtained in Examples 41 and 47 were placed in a polystyrene container (23 cm. x 30 cm. and 6 cm. in depth), into which 100 full grown larvae of northern house mosquito were released. On the following day, more than 90% of the larvae were found dead.

TEST EXAMPLE 10

0.5 g. of the granular composition obtained in Example 48 was dropped into 10 l. of water contained in a 14-l. polyethylene pail. After one day, 100 full grown larvae of northern house mosquito were released into said water. In 24 hours, more than 90% of the mosquito larvae were found dead.

What we claim is:

1. A compound represented by the formula

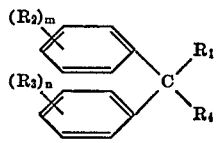

wherein $R_1$ is —COOR, in which R is propargyl or allyl; $R_2$ and $R_3$ are hydrogen, chlorine, or an alkyl having 1 to 4 carbon atoms; when R is propargyl $R_4$ is —OR' or —CH$_2$OR' in which R' is propargyl, allyl, or an alkyl having 1 to 4 carbon atoms; when R is allyl $R_4$ is —OR''' or —CH$_2$OR''' in which R''' is allyl or an alkyl having 1 to 4 carbon atoms; $m$ and $n$ are integers in the range of 1 to 5 and when $m$ and/or $n$ is an integer of 2 or more, the $R_2$'s and the $R_3$'s may be the same or different.

2. A compound represented by the formula

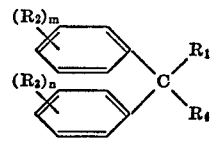

wherein $R_1$ is —COOR, in which R is propargyl or allyl; $R_2$ and $R_3$ are hydrogen, chlorine, or an alkyl having 1 to 4 carbon atoms; when R is propargyl $R_4$ is —OR' in which R' is propargyl, allyl, or an alkyl having 1 to 4 carbon atoms; when R is allyl $R_4$ is —OR''' in which R''' is allyl or an alkyl having 1 to 4 carbon atoms; $m$ and $n$ are integers in the range of 1 to 5 and when $m$ and/or $n$ is an integer of 2 or more, the $R_2$'s and the $R_3$'s may be the same or different.

3. A compound of the formula

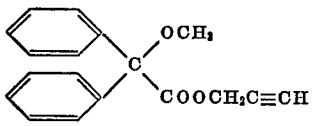

4. A compound of the formula

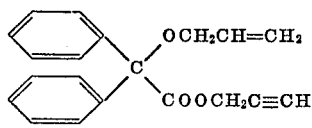

5. A compound of the formula

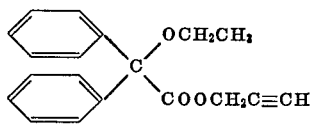

6. A compound of the formula

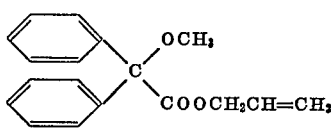

7. A compound of the formula

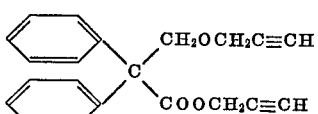

8. A compound of the formula

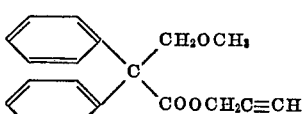

9. A compound of the formula

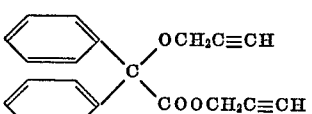

References Cited

FOREIGN PATENTS 1,447,122  6/1966  France _____ 260—473 A

LORRAINE A. WEINBERGER, Primary Examiner
J. F. TERAPANE, Assistant Examiner

U.S. Cl. X.R.

260—340.5, 515 R, 515 A, 544 M, 611 A; 424—282, 308, 339